Figure 1:
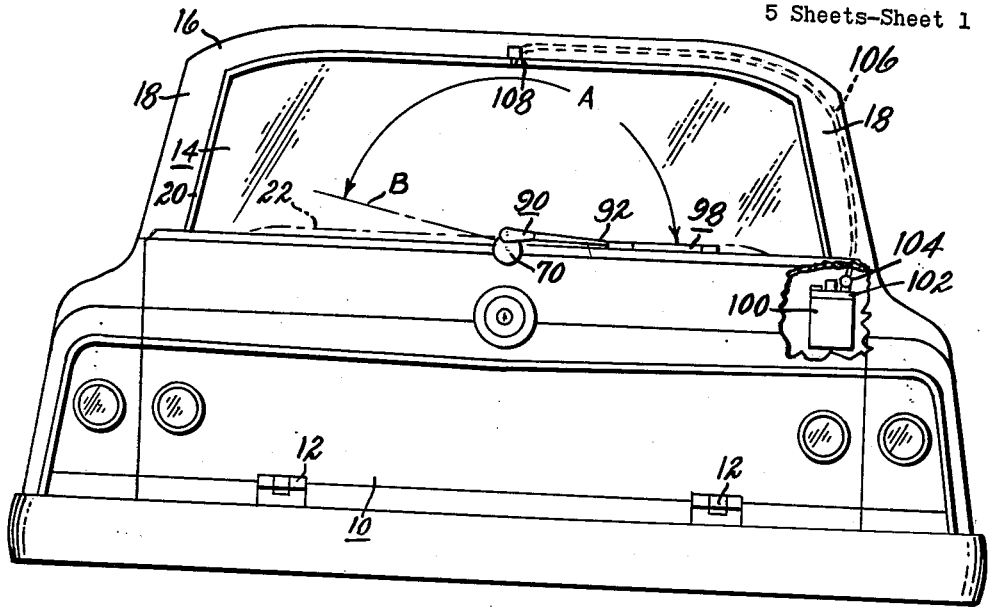

Dec. 3, 1963   L. M. FORBUSH ETAL   3,112,510
VEHICLE WINDOW CLEANING MECHANISM
Filed Oct. 15, 1962   5 Sheets-Sheet 1

INVENTORS
LOTHROP M. FORBUSH
GILBERT H. WOLF
KEITH E. WOOD
BY
W. E. Finken
THEIR ATTORNEY

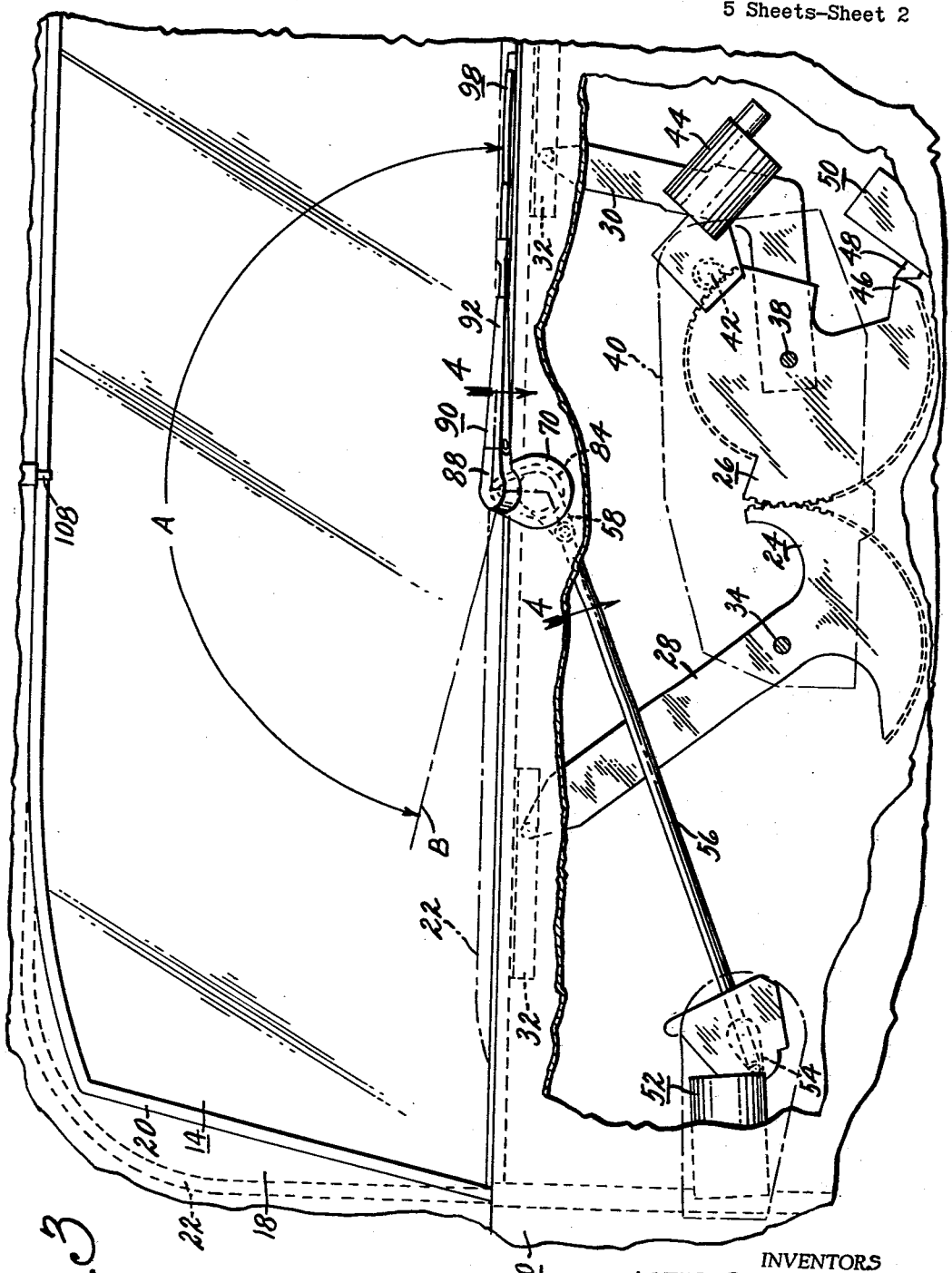

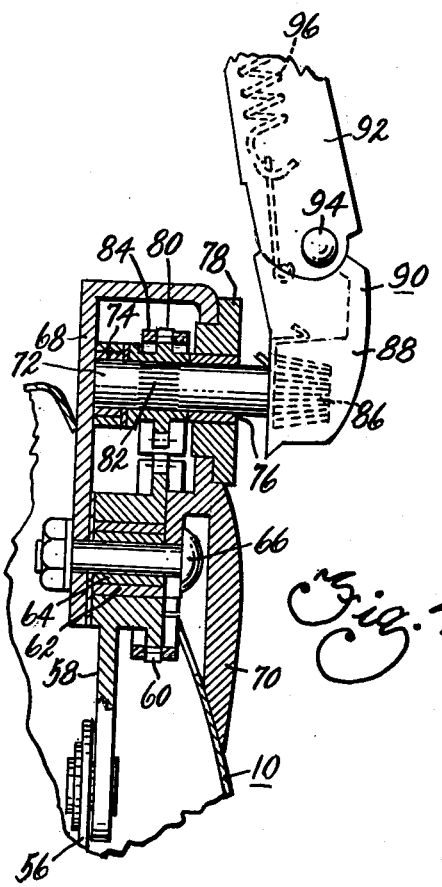
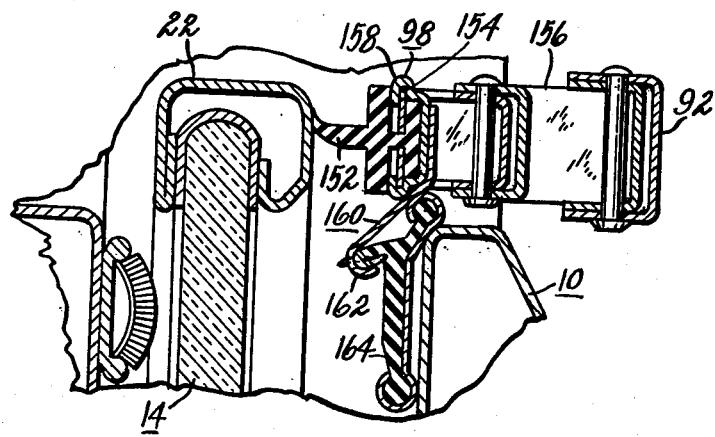

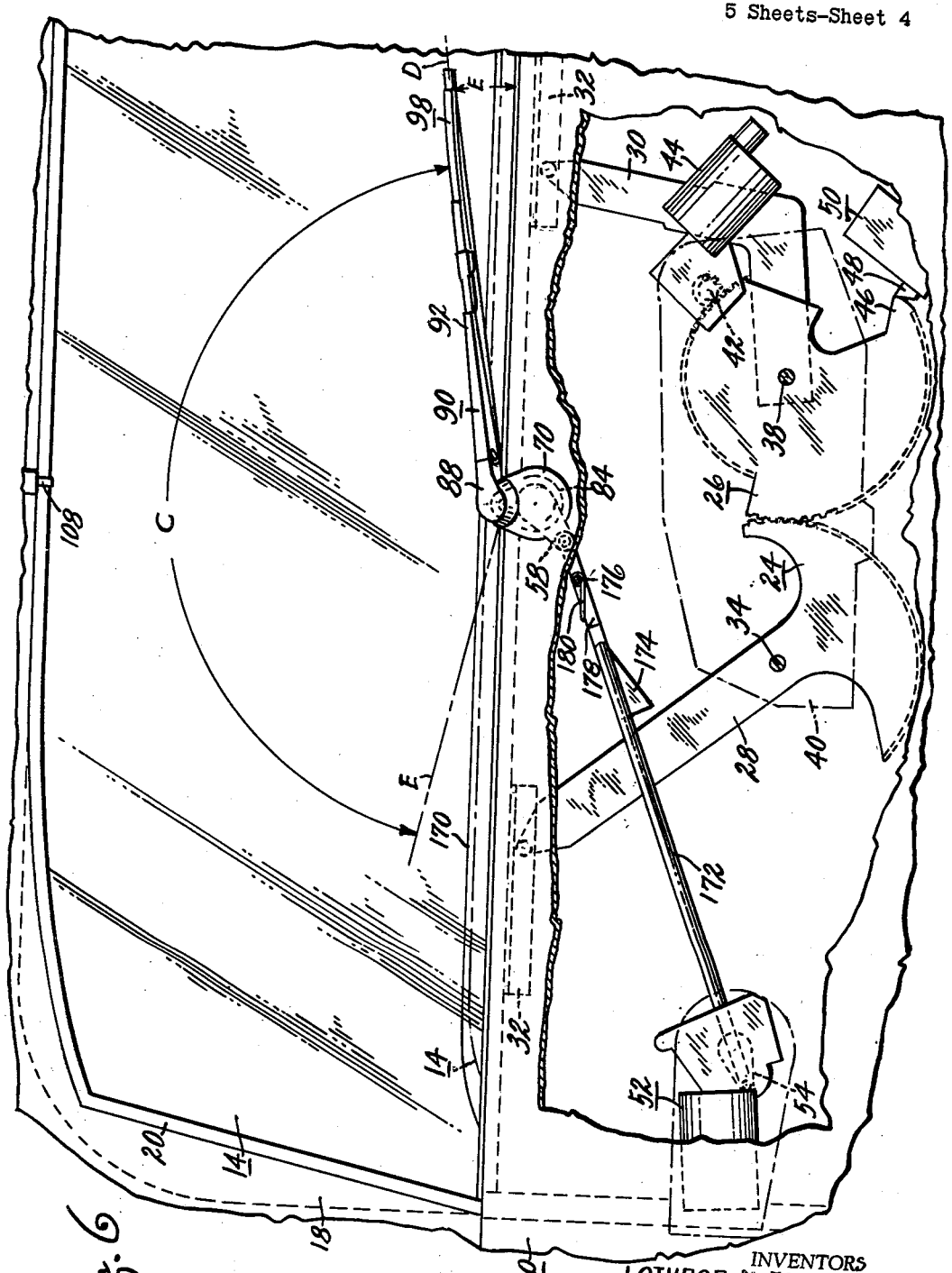

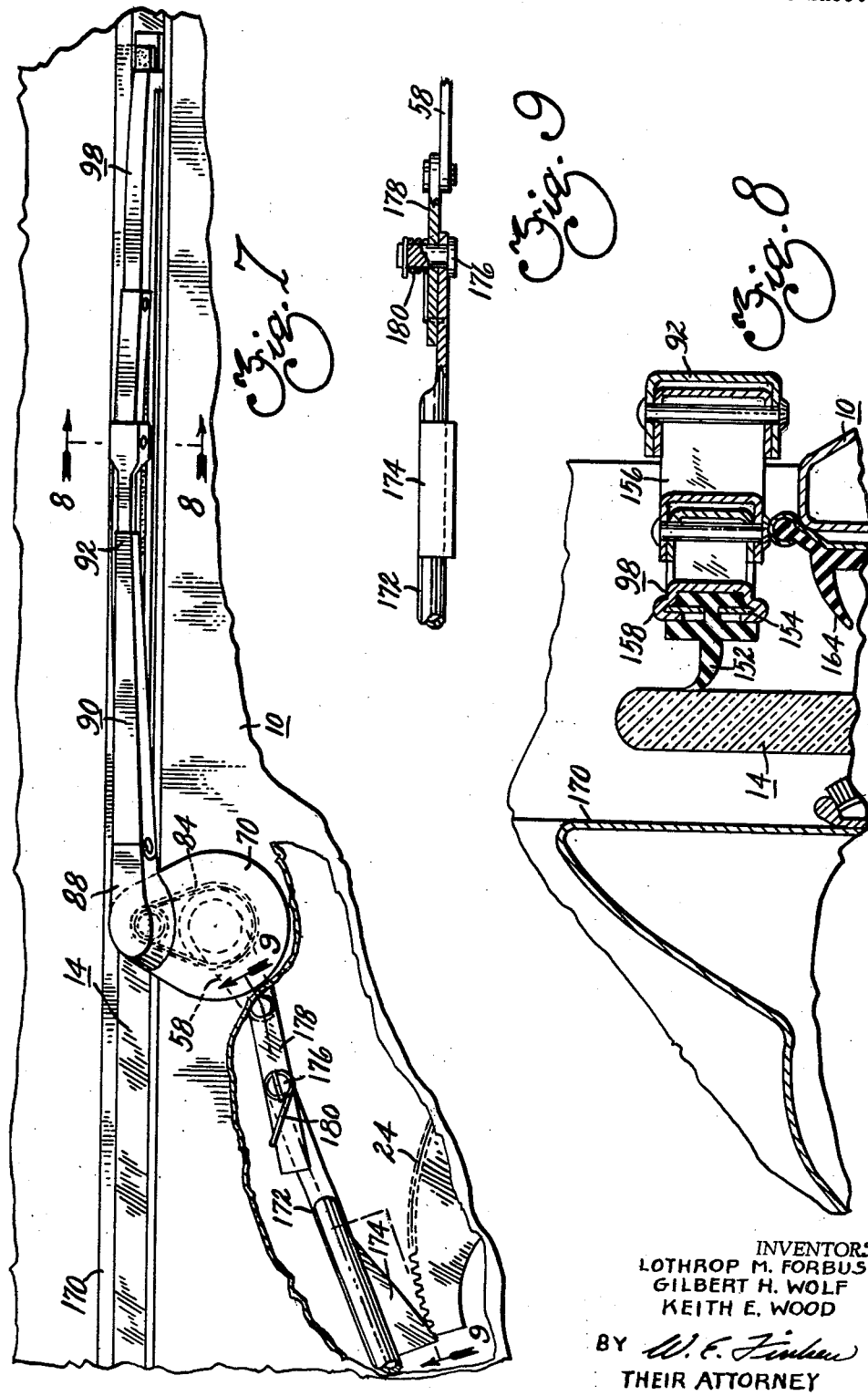

United States Patent Office 3,112,510
Patented Dec. 3, 1963

3,112,510
VEHICLE WINDOW CLEANING MECHANISM
Lothrop M. Forbush, Birmingham, Gilbert H. Wolf, Milford, and Keith E. Wood, Armada, Mich., assignors to General Motors Corporation, Detroit, Mich., a corporation of Delaware
Filed Oct. 15, 1962, Ser. No. 230,417
14 Claims. (Cl. 15—250.01)

This invention pertains to vehicle window cleaning systems, and particularly to a cleaning system for a vertically movable tailgate window of a station wagon type vehicle.

It is well recognized that a great quantity of vision obscuring material is deposited on substantially vertically disposed tailgate windows of station wagon type vehicles. Since it is desirable that the driver have adequate rearward vision at all times, the present invention is directed to a cleaning system for movable tailgate windows including a wiper unit and a washer unit capable of conjoint operation to clean an adequate area of a tailgate window, and wherein the wiper blade of the wiper unit is automatically moved to a parked position against the upper edge of the tailgate when the tailgate window is lowered.

Accordingly, among our objects are the provision of a rear window cleaning system for vehicles including a washer unit and a wiper unit capable of conjoint operation; the further provision of a wiper unit for the rear window of a vehicle including means to positively park the wiper blade; the further provision of a cleaning system for the movable rear window of a vehicle including means to automatically park the wiper blade and deactivate the washer unit when the window is lowered; the further provision of a system of the aforesaid type including an adjustable length wiper linkage actuated by the window adjusting mechanism for automatically moving the wiper blade to a depressed parked position when the window is fully lowered; the further provision of a system of the aforesaid type including means precluding upward movement of the wiper blade from its parked position when the tailgate window is fully lowered; and the still further provision of means for protecting the exposed edge of the tailgate window when it is fully lowered with the wiper blade in its parked position in engagement with the window.

The aforementioned and other objects are accomplished in the present invention by utilizing an electric motor driven wiper unit and an electric motor driven washer unit, the energizing circuits of which include a limit switch for precluding operation of both the wiper unit and the washer unit at all times except when the tailgate window is substantially fully closed. Specifically, two embodiments of a wiper unit are disclosed herein, both embodiments including a movement amplifying transmission so as to impart oscillation to the wiper arm and blade assembly throughout an angle of at least 160°. In one embodiment, the wiper arm and blade assembly is parked adjacent one of its normal stroke end positions in a substantially horizontal position. In the second embodiment, the wiper arm and blade assembly is positively moved to a depressed parked position beyond its normal stroke end position by an adjustable length linkage operated by the window actuating mechanism when the tailgate window is fully lowered.

Further objects and advantages of the present invention will be apparent from the following description, reference being had to the accompanying drawings, wherein preferred embodiments of the present invention are clearly shown and wherein similar numerals depict similar parts throughout the several views.

Figure 2:
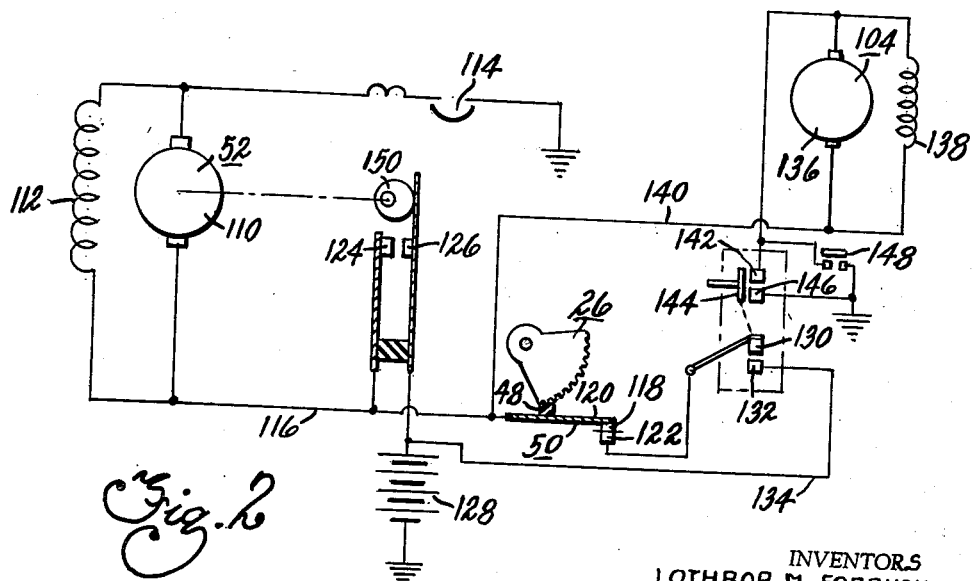

In the drawings:
FIGURE 1 is a fragmentary view in elevation with certain parts broken away, of a vehicle equipped with the rear window cleaning system of this invention.
FIGURE 2 is an electric schematic of the energizing circuit of the wiper unit and the washer unit.
FIGURE 3 is an enlarged fragmentary view with certain parts broken away, depicting one embodiment of the wiper unit.
FIGURE 4 is an enlarged view, partly in section and partly in elevation, taken along line 4—4 of FIGURE 3.
FIGURE 5 is a fragmentary sectional view of a wiper blade in the parked position with the tailgate window fully lowered.
FIGURE 6 is an enlarged fragmentary view with certain parts broken away depicting a wiper unit constructed according to the second embodiment of the present invention.
FIGURE 7 is an enlarged fragmentary view with certain parts broken away depicting the manner in which the wiper arm and blade assembly is parked with the wiper unit constructed as shown in FIGURE 6.
FIGURE 8 is an enlarged fragmentary sectional view taken along line 8—8 of FIGURE 7.
FIGURE 9 is a sectional view taken along line 9—9 of FIGURE 7.

With particular reference to FIGURE 1, the present invention is directed to a cleaning system for the rear window of station wagon type vehicles having a tailgate 10 swingable about a horizontal axis on hinges 12 adjacent its lower edge between substantially vertical and horizontal positions. The tailgate 10 carries a substantially vertically disposed movable window 14 which is shown in the raised position, in full lines, and completely lowered, in phantom lines, in FIGURE 1. The roof 16 of the vehicle is supported in part by the rear pillars 18 which include channels for guiding the tailgate window 14 during upward and downward movement thereof when the tailgate is closed. The window opening defined by the roof 16 and the pillars 18 may, as shown, have a reveal molding 20 secured to its peripheral edge.

Referring to FIGURE 3, the tailgate window 14 may be provided with a protective metal bead, or rim, 22 along its edges. The fully lowered position of the window 14 is depicted in phantom lines in FIGURE 3, from which it can be seen that the protective rim 22 along the upper edge of the window projects above the upper edge of the tailgate 10. The regulator, or actuating, mechanism for raising and lowering the tailgate window 14 comprises a pair of interengaging sector gears 24 and 26 having arms 28 and 30, respectively, attached thereto, the upper ends of which are slidably disposed in lower sash channel cams 32 secured to the lower frame of the window 14. The sector gears 24, 26 and arms 28, 30 are movable about pivot shafts 34 and 38, respectively, carried by a bracket 40 attached to an inner panel of the tailgate. As shown, the sector gear 26 is engaged by a pinion gear 42 which is driven by a reversible electric motor 44 through a suitable gear reduction unit. To lower the tailgate window 14 the sector gear 26 is rotated in the clockwise direction about its pivot shaft 38 thereby imparting counterclockwise rotation to the sector gear 24. When the tailgate window 14 is in its fully closed position, as depicted in full lines in FIGURE 3, the protruding end 46 of the sector gear 26 engages a plunger 48 of a limit switch 50 disposed between the inner end and outer walls of the tailgate 10. When the end 46 of the sector gear 26 depresses the plunger 48, as shown in FIGURE 3, the limit switch is closed. However, whenever the tailgate window 14 is lowered, or opened, the end 46 of the sector gear 26 is disengaged from the plunger 48 thus opening the limit switch 50. The function of the limit switch 50 will be pointed out more particularly hereinafter.

The wiper unit for the tailgate window 14 comprises a unidirectional direct current electric motor 52 connected through a suitable gear reduction to a rotatable crank arm 54. The motor 52 and gear reduction are suitably mounted between the inner and outer panels of the tailgate 10. The crank arm 54 is pivotally connected to one end of a drive link 56, the other end of which is pivotally connected to a second crank arm 58. Referring to FIGURE 4, the crank arm 58 is integral with a sprocket wheel 60 journalled on a sleeve bearing 62. The sleeve bearing 62 is supported on a bushing 64 carried by a bolt 66 which interconnects parts 68 and 70 constituting a transmission housing. The transmission housing is attached to the tailgate 10 by a plurality of bolts, not shown, having threaded engagement with the housing part 70.

A rockshaft 72 is journalled in the transmission housing by spaced sleeve bearings 74 and 76, the sleeve bearing 76 being carried by a closure plate 78. A second sprocket wheel 80 is press fitted on a knurled portion 82 of the rockshaft 72 so as to be drivingly connected therewith. The sprocket wheels 80 and 60 are connected by a chain 84, the sprocket wheel 60 having a greater pitch diameter and number of teeth than the pitch diameter and number of teeth on the sprocket wheel 80 so as to amplify the movement imparted to the rockshaft 72 from the crank arm 58.

Thus, during rotation of the crank 54, the link 56 will have to and fro movement imparted thereto so as to oscillate the crank arm 58 and sprocket wheel 60 throughout an angle of substantially 90°. The ratio of the pitch diameter of the sprocket wheels 60 and 80 is selected to increase the oscillatory movement imparted to the rockshaft 72 to an angle of at least 160° so as to clear an adequate area of the tailgate window 14. To this end, the rockshaft 72 has a serrated spindle 86 attached to its outer end for driving engagement with a mounted section 88 of a wiper arm 90. The wiper arm 90 includes a blade carrying section 92 which is hinged to the mounting section 88 by a transversely extending pin 94 and biased towards the tailgate window 14 by an extension spring 96. The wiper arm 90 carries a flexible wiper blade assembly 98 adapted to engage the outer surface of the tailgate window 14.

As shown in FIGURES 1 and 3, the transmission housing is mounted centrally of the tailgate such that the axis of the rockshaft for oscillating the wiper arm and blade assembly, or cleaner assembly, coincides with the center line of the vehicle. The stroke of the wiper blade 98 extends through an angle A, from a substantially horizontal parked position whereat the wiper blade engages the upper edge of the tailgate 10 to an outboard stroke end position B. Thus, substantial portions of the window 14 are cleaned on both sides of the center line of the vehicle.

The washer unit for the tailgate window 14 comprises a liquid solvent reservoir 100 preferably mounted in the spare tire compartment of the vehicle. The reservoir 100 is closed by a cover 102 which carries an electric motor 104. The motor 104 is connected to a centrifugal pump disposed within a measuring chamber within the reservoir 100 and is designed to discharge a measured quantity of liquid solvent upon energization of the electric motor 104, after which the motor 104 is automatically deenergized by a pressure responsive switch. The washer unit delivers liquid solvent to a conduit 106 concealed within the pillar 18 and the roof 16 connected to a nozzle 108 mounted centrally on the roof 16 for spraying liquid onto the window 14 into the path of movement of the wiper blade 98.

With reference to FIGURE 2, the energizing circuits for the wiper unit and the washer unit will be described. The wiper motor 52 includes an armature 110 and a shunt field winding 112, one terminal of the armature being connected to ground through a thermal overload circuit breaker 114. The other terminal of the armature is connected to a wire 116 through movable contact 118 of the limit switch 50. The movable contact 118 is shown carried by a leaf spring 120 which is inherently biased away from the fixed contact 122. The wire 116 is also connected to a leaf spring carried parking switch contact 124 which is engageable with a second leaf spring carried cyclically actuated parking switch contact 126. The parking switch contact 126 is connected to one terminal of a battery 128, the other terminal of which is grounded. The plunger 48 is shown in engagement with the sector gear 26 for maintaining the limit switch contacts 118 and 122 in the closed position, thus indicating that the tailgate window 14 is substantially fully closed. The stationary contact 122 to the limit switch is connected in series with a movable contact 130 of a manual wiper control switch having a stationary contact 132 connected by wire 134 to the battery 128.

The washer unit motor 104 includes an armature 136 and a shunt field winding 138, one terminal of the armature 136 being connected by a wire 140 with the wire 116. The other terminal of the armature 136 is connected to a stationary switch contact 142 of a push button washer switch including a bridging contact 144. The other stationary contact 146 of the washer switch is connected to ground. The washer control switch is shunted by a pressure responsive switch 148.

The manual wiper and washer control switch is preferably of the type disclosed in Ziegler Patent No. 2,905,962 such that the push button contact 144 includes a one-way driving connection with the movable contact 130 of the wiper switch so as to automatically close the wiper switch concurrently with closure of the washer switch. When the push button contact 144 is released, the manual wiper switch remains closed until the contact 130 is manually opened. By using this type of switch arrangement, operation of the wiper unit is automatically coordinated with that of the washer unit.

When the tailgate window 14 is fully or substantially fully closed, the limit switch 50 is closed thereby enabling the energizing circuits to both the wiper unit and the washer unit to be completed. Thus, upon movement of the manual wiper switch contact 130 into engagement with switch contact 132, the wiper motor 52 will be energized from the battery 128 through wire 134, contacts 132 and 130, contacts 122 and 118 of the limit switch 50, and wire 116. The wiper motor 52 will impart oscillatory movement to the wiper blade 98 between its substantially horizontal parked position and its outboard end position B. If the tailgate window 14 is lowered during operation of the wiper motor 52, the sector gear 26 will move away from the plunger 48 thus opening the limit switch 50. The wiper motor 52 will be automatically deenergized when the wiper blade 98 arrives at its parked position due to operation of the automatic parking switch contacts 124 and 126 which are actuated by a wiper motor driven cam 150. The energizing circuit to the wiper motor 52 will remain open irrespective of the manual control switch until the tailgate window 14 is moved to the fully or substantially fully closed position whereat the limit switch 50 will be closed.

To initiate a conjoint cycle of operation of the wiper unit and the washer unit, the push button switch contact 144 is momentarily depressed, and if the window 14 is fully closed, the washer motor 104 will be energized, and delivery of liquid solvent will close the pressure switch 148 until the measured volume of liquid solvent has been discharged from the reservoir 100. Concurrently with closing the push button switch 144, the wiper unit will be energized by closure of the manual control switch so as to clean the window 14 by simultaneously spraying liquid solvent thereonto during movement of the wiper blade 98 thereacross. If, during such a cycle of conjoint operation, the tailgate window 14 is lowered so as to open limit switch 50, the washer motor 104 will be deenergized, as will the wiper motor 52 when the blade 98 arrives at its parked position.

Referring to FIGURE 5, the wiper blade 98 is shown in its parked position with the tailgate window 14 fully lowered. The wiper blade 98 is shown including a squeegee 152 carried by a flexible backing strip 154, the backing strip being carried by a pressure applying superstructure 156 comprising a plurality of pivotally interconnected yokes and levers for applying wiper arm pressure to the backing strip 154 and the squeegee 152. A clamp 158 embraces the marginal edges of the side rails of the medial portion of the backing strip 154. A retaining clip 160 is attached to the clamp 158, the retaining clip having a return bend portion 162 for gripping the outer belt weather seal 164 attached to the tailgate 10. The function of the detaining clip 160 is to prevent the wiper blade 98 from moving above the bead 22 on the upper edge of the tailgate window 14 when the window is in its fully lowered position as seen in FIGURE 5, and the tailgate is dropped to its horizontal position.

Referring to FIGURES 6 through 9, a second embodiment of a wiper unit for cleaning a tailgate window will be described. In this embodiment the window regulating mechanism is identical with that previously described and thus includes sector gears 24 and 26 having arms 28 and 30, respectively engageable with the lower sash channel cams 32 of the window frame. The sector gear 26 is driven by a pinion gear 42 through a gear reduction unit from a reversible electric motor 44. However, in this embodiment as shown particularly in FIGURE 8, the tailgate window 14 has an exposed edge, and to protect this exposed edge the inner garnish molding 170 is elevated, or raised, such that the garnish molding 170 projects above the edge of the tailgate window 14 when it is in its fully lowered position.

The wiper motor 52 may be identical with the motor of the first embodiment and thus includes a rotary crank arm 54 pivotally connected to the inner end of a drive link 172. The outer end of the drive link 172 is formed with an integral cam 174 and is pivotally connected by a pin 176 to a second link 178. The pin 176 is rigidly attached to the outer end of link 172. The second link 178 is pivotally connected to the crank arm 58 of the wiper transmission assembly. Links 172 and 174 are normally maintained in straight line relation with respect to each other by a torsion spring 180 having one end attached to the pin 176, the intermediate portion encircling the pin 176 and the other end overhanging the edge of the link 178.

The crank arm 58 is connected to the rockshaft for the wiper arm 90 which carries wiper blade 98 through a chain and sprocket-type movement amplifying transmission as in the first embodiment. However, the ratio of the pitch diameter of the sprocket wheels in the embodiment shown in FIGURES 6 through 9 will be slightly less than that in the first embodiment such that during rotation of the crank arm 54 so as to impart to and fro movement to the links 172 and 178, the wiper blade and arm are moved throughout an angle C which is slightly less than the angle A of the first embodiment. Moreover, the normal stroke of the blade and arm assembly of the second embodiment is such that both stroke end positions D and E are angularly displaced from the horizontal.

The normal park position of the wiper blade and arm assembly in the embodiment shown in FIGURES 6 through 9 when the window 14 is fully raised is indicated by the line D from which it may be seen that the blade 98 does not engage the upper edge of the tailgate 10. However, when the window 14 is fully lowered as shown in FIGURE 7, the upper edge of the sector gear 24 engages the cam 174 of the link 172 thereby effecting relative pivotal movement between the links 172 and 178 against the bias of the torsion spring 180 thus shortening the effective length of the linkage between the motor driven crank arm 54 and the transmission assembly crank arm 58 so as to impart further clockwise movement to the wiper arm and blade assembly through the angle E whereat it is in firm engagement with the upper edge of the tailgate 10 as shown in FIGURES 7 and 8. In this depressed parked position the wiper blade 98 engages the exposed edge of the tailgate window 14 and is positively retained in this parked position by the linkage 172 and 178 so as to prevent the wiper blade and arm assembly from moving above the glass 14 when the tailgate 10 is dropped to a substantially horizontal position.

The energizing circuit for the wiper unit of the second embodiment is identical to that described in conjunction with the first embodiment. Moreover, it is to be understood that the wiper unit of the second embodiment can be operated conjointly with a washer unit in precisely the same manner as the wiper unit of the first embodiment.

While the embodiments of the invention as herein disclosed constitute preferred forms, it is to be understood that other forms might be adopted.

What is claimed is as follows:

1. In a vehicle having a tailgate swingable about a horizontal axis between substantially vertical and horizonal positions and carrying a window capable of being raised and lowered when the tailgate is in said substantially vertical position, means for raising and lowering said window including a sector gear, a wiper unit for said window comprising a wiper motor mounted in said tailgate, a rockshaft supported in said tailgate adjacent the upper edge thereof, drive means interconnecting said motor and said rockshaft for imparting oscillation thereto, and a wiper blade and arm assembly attached to said rockshaft for oscillation across the outer surface of said window between predetermined stroke end positions, a manual control for said wiper motor, and auxiliary control means for said wiper motor actuated by said sector gear for automatically deactivating said wiper motor to arrest movement of said wiper blade and arm assembly at one of its stroke end positions when the window is lowered.

2. In a vehicle having a tailgate swingable about a horizontal axis between substantially vertical and horizontal positions and carrying a window capable of being raised and lowered when the tailgate is in said substantially vertical position, linkage means for raising and lowering said window, a wiper unit for said window comprising a wiper motor and a wiper blade and arm assembly oscillatable by said motor across said window between predetermined stroke end positions, a manual control for said wiper motor, and auxiliary control means for said wiper motor actuated by said linkage means for automatically deactivating said wiper motor to arrest movement of said wiper blade and arm assembly at one of its stroke end positions when the window is lowered.

3. In a vehicle having a tailgate swingable about a horizontal axis between substantially vertical and horizontal positions and carrying a window capable of being raised and lowered when the tailgate is in said substantially vertical position, linkage means for raising and lowering said window, a wiper unit for said window comprising an electric wiper motor and a wiper blade and arm assembly oscillatable by said wiper motor between predetermined stroke end positions, an energizing circuit for said electric wiper motor including a manual control switch for completing the energizing circuit to said motor and a wiper motor operated parking switch for interrupting the energizing circuit for said motor so as to arrest movement of said wiper blade and arm assembly at one of said stroke end positions, and a limit switch connected in series with said manual control switch and actuated by said linkage means for interrupting said energizing circuit when the window is lowered.

4. In a vehicle having a tailgate swingable about a horizontal axis between substantially vertical and horizontal positions and carrying a window capable of being raised and lowered when the tailgate is in said substantially vertical position, linkage means for raising and lowering said window, a wiper unit for said window including an electric wiper motor and a wiper blade and arm assembly oscillatable by said wiper motor across the outer surface of said window between predetermined stroke end positions, a washer unit for said window comprising an electric washer motor for driving a pump and nozzle means for spraying liquid solvent onto said window into the path of movement of said blade and arm assembly, an energizing circuit for said wiper motor including a manual control switch and a wiper motor operated parking switch for automatically deenergizing said wiper motor when the blade and arm assembly arrives at one of said stroke end positions, an energizing circuit for said washer pump motor including a second manual control switch, and a limit switch connected in both of said energizing circuits and actuated by said linkage means for automatically interrupting said circuits when the window is lowered.

5. In a vehicle having a tailgate swingable about a horizontal axis between substantially vertical and horizontal positions and carrying a window capable of being raised and lowered when the tailgate is in said substantially vertical position, actuating means for raising and lowering said window including a pair of interengaging sector gears, a wiper unit for said window comprising an electric wiper motor mounted in said tailgate, a rockshaft supported in said tailgate adjacent the upper edge thereof, linkage means interconnecting said wiper motor and said rockshaft for imparting oscillation thereto and a wiper blade and arm assembly attached to said rockshaft for oscillation across the outer surface of said window between predetermined stroke end positions, an energizing circuit for said wiper motor including a manual control switch for completing the energizing circuit and a wiper motor operated parking switch for automatically interrupting said energizing circuit and arresting movement of said blade and arm assembly at one of said predetermined stroke end positions, and a limit switch connected in series with said manual switch and actuated by one of said sector gears for automatically interrupting said energizing circuit when the window is lowered to cause said parking switch to arrest movement of said wiper blade and arm assembly at said one stroke end position.

6. The combination set forth in claim 5 wherein said window projects above the upper edge of said tailgate in its fully lowered position, and wherein said wiper blade and arm assembly engages the upper edge of said tailgate and is substantially horizontal at said one stroke end position.

7. The combination set forth in claim 6 wherein said tailgate includes an outer belt weather seal, and wherein said wiper blade and arm assembly includes a retaining clip engageable with said outer belt weather seal when said wiper blade and arm assembly is in said one stroke end position in engagement with the upper edge of said tailgate.

8. The combination set forth in claim 7 wherein said retaining clip is disposed between said window and said outer belt weather seal when the wiper blade and arm assembly is in engagement with the upper edge of said tailgate, and wherein said clip has a return bend portion for gripping said outer belt weather seal.

9. The combination set forth in claim 5 wherein the edge of said window projects above the upper edge of said tailgate when fully lowered, and wherein said tailgate includes an interior garnish molding which projects upwardly above the edge of said window.

10. In a vehicle having a tailgate swingable about a horizontal axis between substantially vertical and horizontal positions and carrying a window capable of being raised and lowered when the tailgate is in said substantially vertical position, actuating means for raising and lowering said window including a pair of interengaging sector gears, a wiper unit for said window comprising a motor mounted in said tailgate, a rockshaft supported in said tailgate adjacent the upper edge thereof, adjustable length linkage means interconnecting said motor and said rockshaft for imparting oscillation thereto and a wiper blade and arm assembly attached to said rockshaft for oscillation across the outer surface of said window between predetermined stroke end positions, a manual control for said wiper motor, auxiliary control means actuated by one of said sector gears for automatically deactivating said wiper motor to arrest movement of said wiper blade and arm assembly at one of said stroke end positions when the window is lowered, and means for automatically adjusting the length of said linkage means to move said wiper blade and arm assembly to a depressed parked position in firm engagement with the upper edge of said tailgate and for retaining said wiper blade and arm assembly in said depressed parked position when said window is fully lowered.

11. In a vehicle having a tailgate swingable about a horizontal axis between substantially vertical and horizontal positions and carrying a window capable of being raised and lowered when the tailgate is in said substantially vertical position, actuating means for raising and lowering said window including a pair of interengaging sector gears, a wiper unit for said window comprising an electric motor a wiper unit for said window comprising an electric motor mounted in said tailgate, a rockshaft supported in said tailgate adjacent the upper edge thereof, adjustable length linkage means interconnecting said motor and said rockshaft for imparting oscillation thereto and a wiper arm and blade assembly attached to said rockshaft for oscillation across the outer surface of said window between predetermined stroke end positions, an energizing circuit for said wiper motor including a manual control switch and a motor operated parking switch for arresting movement of said wiper blade and arm assembly at one of said stroke end positions, and means including one of said sector gears for automatically adjusting the length of said linkage means to move said wiper blade and arm assembly to a depressed park position in engagement with the upper edge of said tailgate and retain the blade and arm assembly in said depressed park position when the window is fully lowered.

12. In a vehicle having a tailgate swingable about a horizontal axis between substantially vertical and horizontal positions and carrying a window capable of being raised and lowered when the tailgate is in said substantially vertical position, actuating means for raising and lowering said window including a pair of interengaging sector gears, a wiper unit comprising an electric wiper motor mounted in said tailgate, a rockshaft supported in said tailgate adjacent the upper edge thereof, adjustable length linkage means interconnecting said wiper motor and said rockshaft for imparting oscillation thereto and a wiper blade and arm assembly attached to said rockshaft for oscillation across the outer surface of said window between predetermined stroke end positions, an energizing circuit for said wiper motor including a manual control switch and a motor operated parking switch for arresting movement of said wiper blade and arm assembly at one of said stroke end positions, a limit switch connected to said energizing circuit and actuated by one of said sector gears for automatically interrupting said energizing circuit when the window is lowered, and means including the other of said sector gears for adjusting the length of said linkage means to move said wiper blade and arm assembly to a depressed parked position in firm engagement with the upper edge of said tailgate when the window is fully lowered.

13. The combination set forth in claim 12 wherein said adjustable length linkage means comprises a pair of pivotally interconnected links, and resilient means for normally maintaining said links in axial alignment with each other.

14. The combination set forth in claim 13 wherein one of said links includes a cam, and wherein said other sector gear is engageable with said cam when the window is fully lowered so as to effect pivotal movement of said links out of axial alignment with each other and thereby adjust the length of said linkage means.

References Cited in the file of this patent

UNITED STATES PATENTS

| | | |
|---|---|---|
| 2,693,612 | Zeigler et al. | Nov. 9, 1943 |
| 2,905,962 | Ziegler | Sept. 29, 1959 |